United States Patent [19]

Tolar

[11] Patent Number: 4,732,019
[45] Date of Patent: Mar. 22, 1988

[54] LOCKING APPARATUS

[76] Inventor: Glenn M. Tolar, 220 E. X St., Deer Park, Tex. 77536

[21] Appl. No.: 78,298

[22] Filed: Jul. 27, 1987

[51] Int. Cl.⁴ .............................................. G05G 5/00
[52] U.S. Cl. .......................................... 70/203; 70/181
[58] Field of Search ................. 70/181, 182, 183, 201, 70/202, 203, 237, 253, 254

[56] References Cited

U.S. PATENT DOCUMENTS

| | | | |
|---|---|---|---|
| 1,097,081 | 5/1914 | Coon | 70/203 |
| 1,102,875 | 7/1914 | Parage | 70/203 |
| 1,138,795 | 5/1915 | Saunders | 70/203 |
| 1,312,204 | 8/1919 | Price | 70/203 |
| 1,533,736 | 4/1925 | Humphrey | 70/203 |
| 3,280,606 | 10/1966 | Howard | 70/181 |
| 3,435,646 | 4/1969 | Michnoff | 70/203 |

*Primary Examiner*—Robert L. Wolfe
*Attorney, Agent, or Firm*—Bill B. Berryhill

[57] ABSTRACT

Locking apparatus for locking a movable object relative to a fixed object including a sleeve member, a rod member and a cylindrical member. The sleeve member is affixed to the fixed object. One end of the rod member is receivable within the sleeve member for rotating and limited axial movement therein. The opposite end of the rod member is provided with a plurality of holes perpendicular to its axis. The cylindrical member may be placed on the opposite end of the rod member for relative rotation and axial movement thereon. One or more holes are provided through the cylindrical member perpendicular to its axis. The cylindrical member has a projecting portion thereon which is engageable with the movable object to lock the movable object relative to the fixed object upon placement of a lock shackle through one of the cylindrical member holes and a corresponding one of the rod member holes.

10 Claims, 3 Drawing Figures

LOCKING APPARATUS

BACKGROUND OF THE INVENTION

1. Field of the Invention

The present invention pertains to locking apparatus. In particular, it pertains to locking apparatus for locking a movable object relative to a fixed object. More specifically, the present invention pertains to apparatus suitable for locking movable components of a tractor or the like for preventing theft thereof.

2. Description of the Prior Art

Many construction vehicles, particularly those made by the same manufacturer, may be operated with a universal ignition key. This especially is true of tractors. In many instances, the same key may be used to operate a variety of tractor models and sizes made by the same manufacturer. As a result, thefts of tractors frequently occur simply by a thief walking on to a job site, locating a tractor not in use, starting the tractor and driving it away unnoticed. In recent years, this has become a major problem causing contractors and owners of tractors and other equipment to lose millions of dollars in equipment.

Over the years, a number of devices have been developed to prevent the unauthorized operation of a vehicle or the like. For example, U.S. Pat. Nos. 1,097,081; 1,102,875; and 1,533,736 disclose locking devices for locking the clutch of an automobile to prevent the automobile from being driven. U.S. Pat. No. 3,435,646 discloses a device for locking the brake of an automotive vehicle. U.S. Pat. No. 1,138,795 discloses apparatus for locking a lever, such as an operating lever for an automobile in a fixed position. Obviously, the purpose of all of these devices is to prevent theft or unauthorized use of the vehicle.

While many of the locking devices of the prior art, including those cited above, serve in some measure to deter or prevent the theft of a vehicle, most are not foolproof. Some of the components thereof may be severed by sawing or cutting with presently available tools. Furthermore, most of the prior devices must be used with a specific model vehicle. For example, utilizing locking devices of the prior art on several models and sizes of tractors might require several different models or sizes of locking devices.

Thus, while a number of locking devices are available, the search continues for more effective locking devices. In addition, the need exists for a simple and efficient locking device which may be universally used with a number of tractor models and sizes.

SUMMARY OF THE PRESENT INVENTION

In the present invention locking apparatus is provided for locking a movable object, such as a clutch crank or lever of a tractor, in a fixed position relative to a relatively fixed object such as the tractor body or frame. The apparatus may comprise at least one sleeve member affixed to the tractor and a rod member one end of which is receivable within the sleeve member for rotating and axial movement therein. The axial movement of the rod member is limited in one direction by a stop shoulder provided by the rod member for engagement with the sleeve member. The other end of the rod member may be provided with a plurality of holes therethrough the axes of which are perpendicular to the axis of the rod member. Also provided is a cylindrical member for placement on the other end of the rod member for rotating and axial movement thereon and having one or more holes therethrough the axes of which are perpendicular to the axis of the cylindrical member. The cylindrical member may be provided with a projecting portion engagable with the tractor clutch crank, which is movable, to lock the crank relative to the tractor upon placement of a lock shackle or the like through one of the cylindrical member holes and a corresponding one of the rod member holes.

One unique feature of the locking apparatus of the present invention is the fact that the axes of alternate ones of the rod member holes are rotated, relative to the rod member axis, ninety degrees from each other. Alignment of one of the cylindrical member holes with successively adjacent holes of the rod member in a direction away from the stop shoulder effects the lengthening of the distance between the stop shoulder and the point of engagement of the projecting portion of the cylindrical member with the clutch crank. This allows a gradual lengthening or foreshortening of the locking apparatus to accomodate different models and sizes of tractors.

The manner in which the sleeve members are affixed to the tractor as well as the design of the other components of the locking apparatus makes it extremely difficult to render inoperative. The components of the locking apparatus are relatively simple and inexpensive. However, the device is extremely efficient and universally adaptable for a number of tractor models and sizes. Other objects and advantages of the invention will be apparent from reading the description which follows in conjunction with the accompanying drawings.

DESCRIPTION OF A PREFERRED EMBODIMENT

Figure 1:
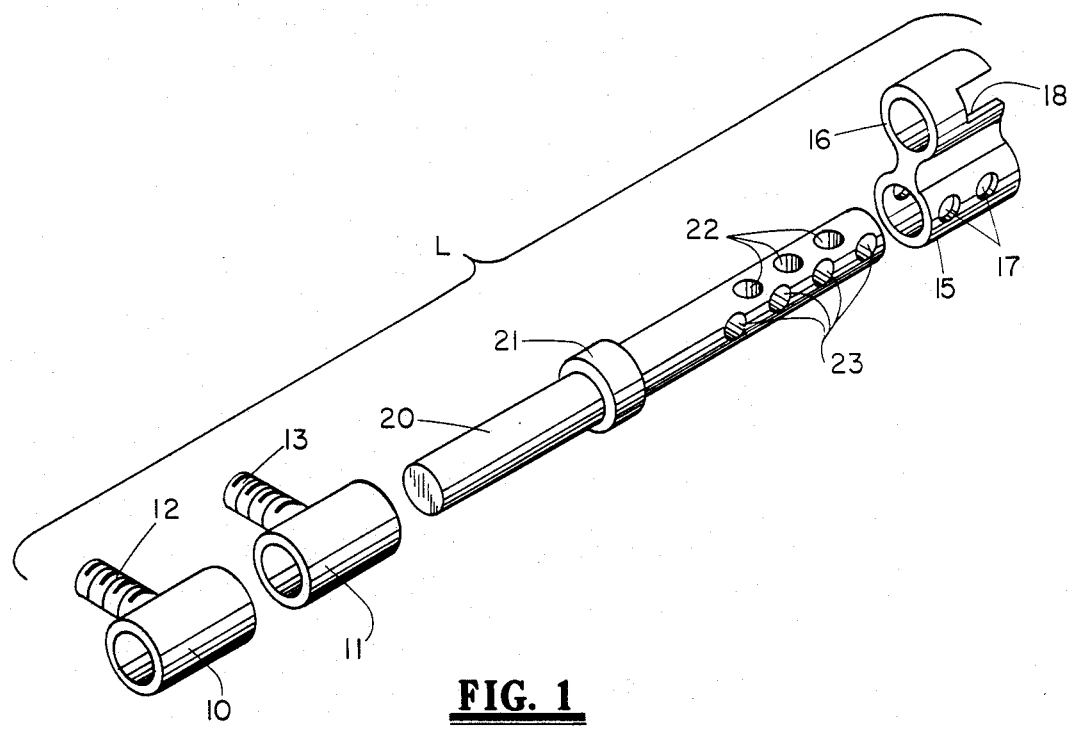
FIG. 1 is an exploded perspective view of components of locking apparatus, according to a preferred embodiment of the invention.
Figure 2:
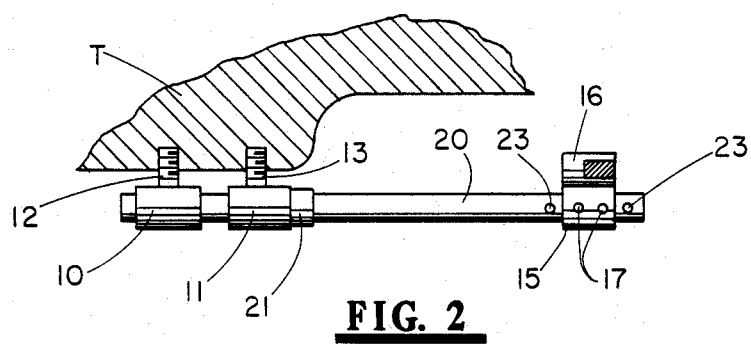
FIG. 2 is a longitudinal view of the locking apparatus of FIG. 1, attached to a tractor and viewed from above.
Figure 3:
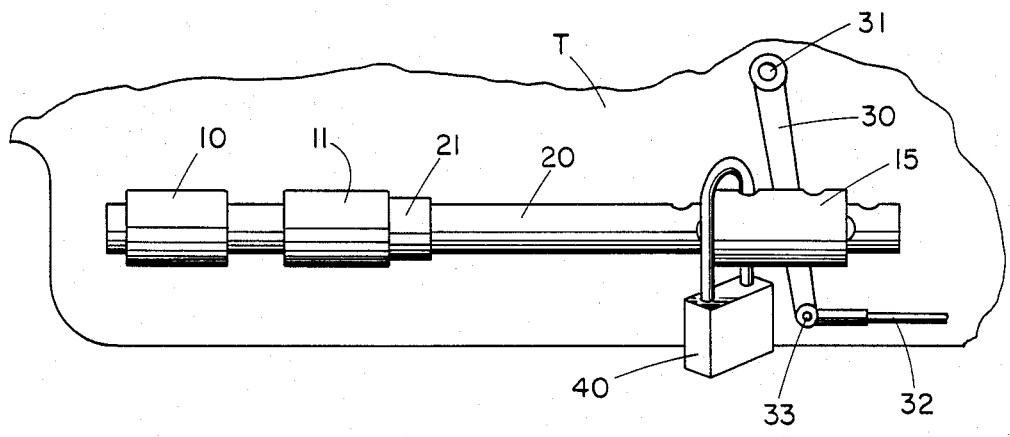
FIG. 3 is a longitudinal view of the locking apparatus of the present invention as viewed from one side of the tractor of FIG. 2.

Referring first to FIG. 1, the locking apparatus L of the present invention comprises a pair of sleeve members 10, 11, a rod member 20 and a cylindrical member 15. Each of the sleeve members 10 and 11 has a threaded member 12, 13 projecting therefrom. As seen in FIGS. 2 and 3, the threaded members 12 and 13 are threadedly engageable with corresponding threaded holes in a fixed object, i.e., tractor T, so that the sleeve members 10 and 11 are coaxially aligned and spaced as shown. All of the components; sleeve members 10, 11, rod 20 and cylindrical member 15; are preferably made of steel.

The rod member 20 is receivable within the sleeve members 10 and 11, such is shown in FIGS. 2 and 3, for rotating and limited axial movement therein. The axial movement is limited in one direction by a stop shoulder provided by an enlarged diameter portion 21 of the rod member 20. The other end of the rod member is provided with a plurality of holes 22, 23, the axes of which are perpendicular to the axis of the rod member 20. Alternate ones of rod member holes 22, 23 are rotated, relative to the rod member axis, ninety degrees from each other. In other words, the axis of holes 22 are rotated ninety degrees relative to the axis of hole 23.

The cylindrical member 15 has an inside diameter which permits the member 15 to receive the end of the rod member 20 which is provided with the holes 22 and 23. The cylindrical member 15 also has one or more holes 17 the axes of which are perpendicular to the axis of the cylindrical member 15. The cylindrical member 15 is provided with a projecting portion 16 which, as shown, is actually another cylindrical or tubular component which is welded alongside the cylindrical member 15. A slot or notch 18 may be cut in one end thereof.

The use of locking apparatus L of the present invention is best understood with reference to FIGS. 1 and 2 in which the apparatus L is attached to a tractor T. As best seen in FIG. 3, the clutch of the tractor T is operated by a crank or lever 30 which moves or pivots at a pivot point 31 and is attached by means of another pivot connection 33 and rod 32 to a clutch pedal or the like (not shown). Depression of the clutch pedal (not shown) causes the crank 30 to rotate in a counterclockwise direction from an engaged to a nonengaged or neutral position, the neutral position being illustrated in FIGS. 1 and 2.

The sleeves 10 and 11 are affixed to the tractor T, by threaded engagement of the threaded projections 12 and 13, and remain with the tractor T at all times. When it is desired to render the tractor T inoperative, the rod 20 is inserted, as shown in FIGS. 2 and 3, so that the enlarged diameter portion 21 and the stop shoulder provided thereby rests against the end of sleeve member 11. The cylindrical member 15 is slid over the other end of the rod member 20 and pushed toward the enlarged diameter portion 21 of the rod 20 until the projecting portion 16 can be rotated behind the crank 30. The cylindrical member 15 is then pushed (toward the right as in FIGS. 1 and 2) until the notch or slot 18 engages the crank 30, the crank 30 being held in the neutral or nonengaged position by the operator's foot on the clutch pedal (not shown). Then one of the holes 22, 23 of the rod member 20 is aligned with one of the holes 17 of the cylindrical member 15 by rotating the rod member 20 until one of the holes 22, 23 correspondingly registers with one of the holes 17. It should be understood that alignment with one of these cylindrical member holes 17 with successively adjacent holes 22, 23 of the rod member 20 in a direction away from the enlarged diameter portion 21 effects a lengthening of the distance between the enlarged portion 21 and the point of engagement of the projecting portion 16 of the cylindrical member 15 with the clutch crank 30.

After the proper hole alignment has been attained, the shackle of a lock 40 may be placed therethrough (FIG. 3) preventing axial or rotational movement of the rod member 20 relative to the sleeves 10 and 11 and the tractor T to which they are affixed. Thus, the clutch crank 30 is locked relative to the tractor T in a fixed position, in this case a neutral position. With the clutch in the neutral position, the tractor T may not be moved under its own power even though a would-be thief has a key for operating the ignition thereof.

As shown, the locking apparatus L of the present invention is extremely sturdy and not susceptable to malfunctioning or unwanted removal. Furthermore, the locking apparatus L may be easily adapted for different models and sizes of tractors simply by lengthening or foreshortening of the locking apparatus L by rotational and axial alignment of rod 20 and cylindrical member 15 so that there is proper alignment between one of the holes 17 and the cylindrical member 15 and one of the holes 22, 23 of the rod member 20.

A single embodiment of the invention has been described as herein. Many variations thereof can be made without departing from the spirit of the invention. Therefore, it is intended that the scope of the invention be limited only by the claims which follow.

I claim:

1. Locking apparatus for locking a movable object relative to a fixed object comprising:

a sleeve member affixed to said fixed object;

a rod member one end of which is receivable within said sleeve member for rotating and axial movement therein, said axial movement being limited in one direction by a stop shoulder provided on said rod member for engagement with said sleeve member, the other end of said rod member being provided with a plurality of holes therethrough the axes of which are perpendicular to the axis of said rod member; and a cylindrical member for placement on said other end of said rod member for rotating and axial movement thereon and having one or more holes therethrough the axes of which are perpendicular to the axis of said cylindrical member, said cylindrical member having a projecting portion engageable with said movable object to lock said movable object, relative to said fixed object, upon placement of a lock shackle or the like through one of said cylindrical member holes and a corresponding one of said rod member holes.

2. Locking apparatus as set forth in claim 1 including a second sleeve member affixed to said fixed object at a fixed distance from said first sleeve member, the axes of said first and second sleeve members coinciding to allow receiving of said one end of said rod member therein for said rotating and limited axial movement.

3. Locking apparatus as set forth in claim 2 in which each of said sleeve members has a threaded member projecting therefrom threadedly engageable with a corresponding threaded hole in said fixed object and by which said sleeve members are affixed thereto.

4. Locking apparatus as set forth in claim 1 in which said stop shoulder is provided by an enlarged diameter portion of said rod member between said one end and said other end thereof.

5. Locking apparatus as set forth in claim 1 in which the axes of alternate ones of said rod member holes are rotated, relative to said rod member axis, ninety degrees from each other.

6. Locking apparatus as set forth in claim 5 in which alignment of one of said cylindrical member holes with successively adjacent holes of said rod member in a direction away from said stop shoulder effects a lengthening of the distance between said stop shoulder and the point of engagement of said projecting portion of said cylindrical member with said movable object.

7. Locking apparatus for locking a movable object relative to a fixed object comprising:

first and second coaxially aligned and spaced sleeve members affixed to said fixed object;

a rod member one end of which is receivable within said sleeve members for rotating and axial movement therein, said axial movement being limited in one direction by a stop shoulder provided on said rod member for engagement with one of said sleeve members, the other end of said rod member being provided with a plurality of holes therethrough the axes of which are perpendicular to the axis of said rod member; and a cylindrical member for sliding placement on the other end of said rod member and having one or more holes therethrough, the axes of which are perpendicular to the axis of said cylindrical member, and having a projecting portion engageable with said movable object to lock said movable object, relative to said fixed object, upon placement of a lock shackle or the like through one of said cylindrical member holes and a corresponding one of said rod member holes.

8. Locking apparatus as set forth in claim 7 in which said stop shoulder is provided by an enlarged diameter portion of said rod member between said one end and said other end thereof.

9. Locking apparatus as set forth in claim 7 in which alignment of one of said cylindrical member holes with successively adjacent holes of said rod member in a direction away from said stop shoulder effects a lengthening of the distance between said one of said sleeve members and the point of engagement of said projecting portion of said cylindrical member with said movable object.

10. Locking apparatus as set forth in claim 9 in which the axes of alternate ones of said rod member holes are rotated, relative to said rod member axis, ninety degrees from each other.

* * * * *